WILLIAM HECKERT

Improvement in Devices for Changing Speed in Machinery.

No. 125,677.  Patented April 16, 1872.

Inventor
William Heckert

Witnesses 125,677

UNITED STATES PATENT OFFICE.

WILLIAM HECKERT, OF NEWCASTLE, PENNSYLVANIA.

IMPROVEMENT IN DEVICES FOR CHANGING SPEED IN MACHINERY.

Specification forming part of Letters Patent No. 125,677, dated April 16, 1872.

*To all whom it may concern:*

Be it known that I, WILLIAM HECKERT, of Newcastle, in the county of Lawrence and State of Pennsylvania, have invented a new and Improved Speed-Changer; and I do hereby declare that the following is a full, clear, and exact description thereof, reference being had to the accompanying drawing making part of this specification, in which—

Figure 1:
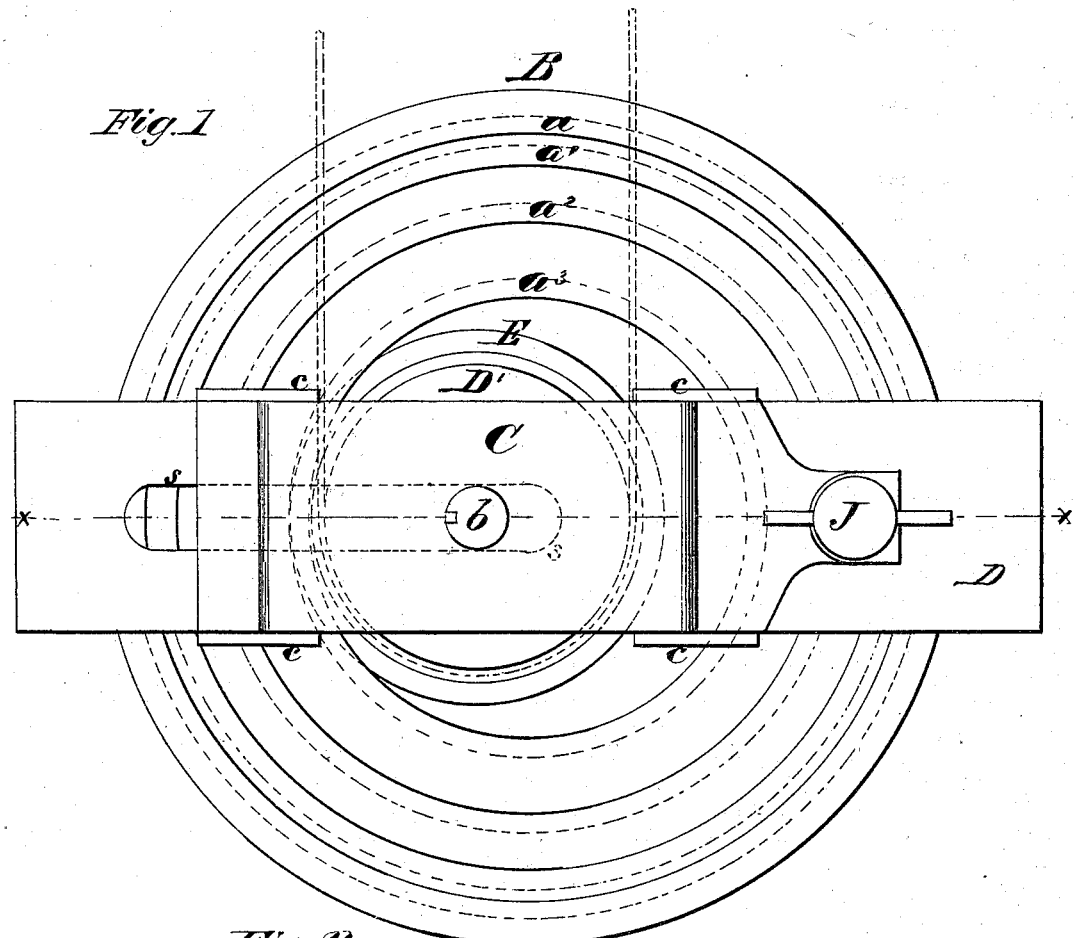
Figure 2:
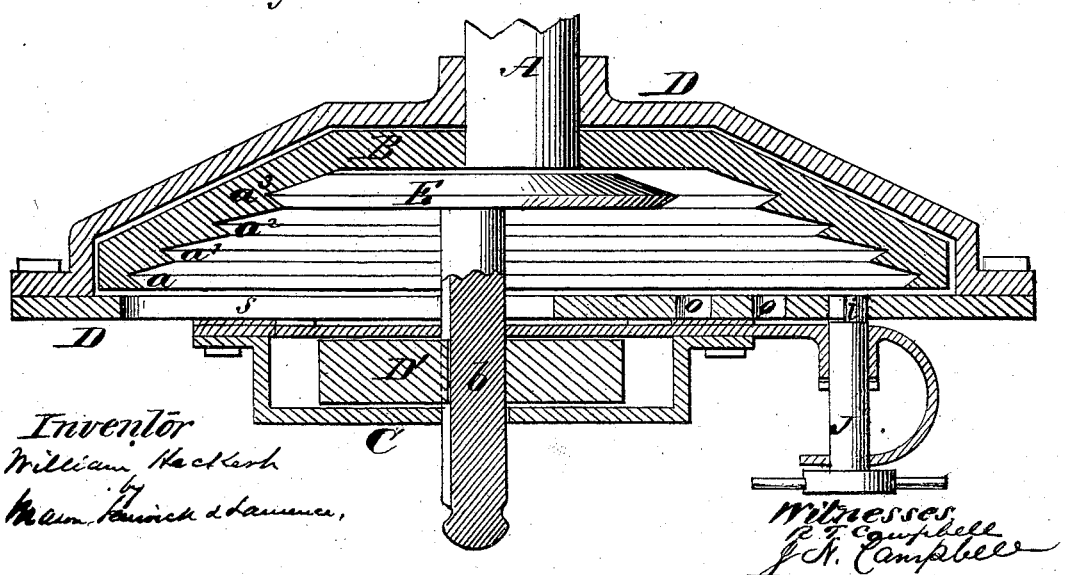

Figure 1 is a side view of the speed-changer. Fig. 2 is a diametrical section through the same.

Similar letters of reference indicate corresponding parts in the several figures.

This invention relates to a new and improved speed-changer which is adapted for all classes of machinery wherein it is desired to transmit power direct from a main shaft, and to change speed, or to stop and start at pleasure, without the use of countershafts, hangers, cones, or shifting-pulleys. The nature of my invention consists, first, in combining a friction or toothed wheel with a hollow cone, which presents stepped friction or toothed surfaces, and in the arrangement of said wheel within the cone and upon the shaft of a belt-wheel in such manner that it can be adjusted to any one of the stepped surfaces at pleasure, or disengaged from the cone altogether, as will be hereinafter explained; second, in combining a cam-shaped holding-pin with the adjustable frame of the friction or toothed wheel in such manner that after the latter is adjusted in contact with any one of the stepped surfaces inside of the hollow cone, it can be forcibly pressed against such surface, as will be hereinafter explained.

The following description of my invention will enable others skilled in the art to understand it.

In the accompanying drawing, A represents the shaft of a hollow conic frustum, B, which shaft has its bearings in a frame, D, as shown in Fig. 2. The conic frustum B may be of any desired size. It is hollow and presents interiorly a number of stepped surfaces, $a$ $a^1$ $a^2$ $a^3$, of different diameters, representing four different speeds. These surfaces may be grooved, as shown in Fig. 2, or they may be flat; or, if desirable, they may be toothed; and there may be but two of these stepped surfaces, or there may be a great number of them. E represents a friction-wheel whose periphery presents beveled surfaces corresponding to the grooved surfaces inside of the conic frustum B. This wheel E is applied fast on the shaft $b$ of a belt-wheel, D′, which shaft has its bearings in a frame or bracket, C, and is endwise adjustable. By means of a feather on the belt-wheel D′ and a groove in the shaft $b$ the wheel D′ will cause the shaft $b$ to rotate with it. The frame or bracket C is connected to the frame D by clasps or other suitable means, which will allow this bracket to be moved endwise on frame D, for the purpose of engaging the wheel E with any one of the stepped surfaces inside of the conic frustum. The slot $s$ through frame D allows the shaft $b$ to move freely. J represents a locking-pin, which can be turned about its axis or moved endwise by means of the head or handle on its outer end. This pin J has its bearings in an extension of the bracket C, and on its inner end is an eccentric or cam portion, $i$, as shown in Fig. 2, which is intended to enter one or the other of several holes, $o$, which are made through the front portion of frame D and hold the bracket firmly in the desired position.

It will be seen from the above description that the wheel E can be adjusted in a direction with the length of its shaft $b$, and also at right angles thereto. The former adjustment permits this wheel E to be brought into line with any one of the stepped surfaces on the conic frustum B, while the other adjustment allows said wheel to be moved into contact with the stepped surface, with which it is in line. The pin J not only serves to hold the wheel E in contact with a stepped surface, but, by giving a slight rotation to this pin after its cam $i$ enters one of the holes $o$, the periphery-wheel E will be forcibly pressed against the conic frustum.

I do not confine myself to the rectilinear sliding bracket C, for it is obvious that the shaft $b$ may have its bearings in a vibrating frame. Neither do I confine myself to friction surfaces, as toothed surfaces may be employed on the wheel E and in the conic frustum B. It is obvious that the same result would be produced if the conic frustum was stepped exteriorly and the wheel E arranged so as to be adjustable to any one of such steps.

What I claim as my invention is—

1. The stepped surfaces in the hollow conic frustum B, in combination with a wheel, E, which is capable of being adjusted to any one of said surfaces, and also of being rotated by a belt which is on its shaft, substantially as described.

2. The locking, holding, and pressure pin J, in combination with the frame of the shaft $b$, the wheel E, and conic frustum B, substantially as described.

WM. HECKERT.

Witnesses:
 JAMES N. CAMPBELL,
 JAMES R. MARTIN, Jr.